United States Patent Office 3,706,720
Patented Dec. 19, 1972

3,706,720
CONTINUOUS PROCESS FOR THE PRODUCTION OF ALFIN POLYMERS
Leo H. Broering, Fort Wright, Ky., and William R. Birchall, Cincinnati, Ohio, assignors to National Distillers and Chemical Corporation, New York, N.Y.
Continuation-in-part of abandoned applications Ser. No. 294,717, July 12, 1963, Ser. No. 661,921, Aug. 21, 1967, and Ser. No. 784,298, Dec. 13, 1968. This application Jan. 16, 1970, Ser. No. 3,539
Int. Cl. C08d 1/20, 3/06; C08f 19/08
U.S. Cl. 260—82.1                            20 Claims

ABSTRACT OF THE DISCLOSURE

A continuous process for the preparation of alfin polymers is provided, effecting the polymerization of the monomer by an alfin catalyst in the presence of a molecular weight moderator, separating unreacted monomer, volatile low polymer and solvent by subjecting the alfin polymer reaction mixture to steam stripping, and thereafter purifying the monomer and solvent and recycling them for reuse, and washing and drying the alfin rubber.

In the process of the invention, molecular weight of the polymer is controlled by adjustment of the proportion of molecular weight moderator. No other modification of reaction conditions, proportions of catalyst, and other process variables is necessary.

---

This application is a continuation-in-part of applications Ser. No. 294,717, filed July 12, 1963, Ser. No. 661,921, filed Aug. 21, 1967 and Ser. No. 784,298, filed Dec. 13, 1968.

This invention relates to a process for the continuous production of alfin polymers, and more particularly to a continuous process for the production of alfin polymers from the monomer with recovery and recycling of unreacted monomer and solvent.

Morton and coworkers in a series of papers in the Journal of the American Chemical Society, starting in 1947, describe an organoalkali metal catalyst for the polymerization of olefins and particularly dienes which they term an alfin catalyst, Journal of the American Chemical Society, 69 161; 167; 950; 1675; 2224 (1947). The name "alfin" is taken from the use of an alcohol and an olefin in their preparation. The alcohol, a methyl n-alkyl carbinol, usually isopropanol, in the form of the sodium salt, the olefin, also in the form of the sodium salt, and an alkali metal halide, form a complex that constitutes the catalyst.

These catalysts are reported by Morton et al. to cause the polymerization of butadiene, isoprene and other dienes, alone and together with other copolymerizable organic compounds, in most cases olefinic in nature. The catalyst was discovered in the course of a study of the addition of organosodium compounds to dienes. Later on, Morton summarized the work done up until 1950 in Industrial and Engineering Chemistry, 42, 1488–1496 (1950).

Exemplary of early interest in the use of alfin catalysts is U.S. Pat. No. 2,592,301, patented Apr. 8, 1952 to Robert G. Linville. Using a batch technique, Linville formed polymers of 1,4-dicyano-2-butene by subjecting the monomer to polymerization conditions in the presence of an alfin catalyst. The polymers were said to be useful as intermediates for the synthesis of polyamines for shrink-proofing wool carboxylic acids, etc.

U.S. Pat. No. 2,606,179 to Boyd, patented Aug. 5, 1952, describes the polymerization of ethylene, using an alfin catalyst in an aliphatic hydrocarbon solvent. The polyethylene produced was said to be distinguished by its clarity, hardness and stability, and had a molecular weight in excess of 20,000.

Foster in U.S. Pat. No. 2,841,574, patented July 1, 1958 claimed that vastly improved results in alfin-type polymerizations can be obtained by using as the solvent certain ethers, acetals, and amines. Foster suggested that the polymerization was effected by an entirely different reaction mechanism than theretofore obtained with alfin catalysts. Foster polymerized propenyl benzene, obtaining a polymer having a molecular weight of about 4500. Polybutadiene was also obtained, but the molecular weight was not given.

The elastomeric polymers obtained from dienes, alone or copolymerized with olefins, using alfin catalysts are termed alfin polymers or alfin rubbers. Because of the speed and ease of the reaction, these attracted considerable interest in the 1940's and early 1950's. However, the very speed of the reaction led to problems. The alfin rubbers have the disadvantage of having an extremely high molecular weight, generally in excess of 3,000,000, and frequently in excess of 10,000,000. As a result, although these polymers are generally gel-free and have high tensile strength, superior abrasion resistance, and tear strength, they are also very tough, and exhibit little breakdown and consequently poor banding on the mill. Therefore, they are difficult if not impossible to process using conventional equipment. Consequently, interest and research in the alfin rubbers until recently was minimal, and in their original form the alfin rubbers have found very little commercial application.

Diem, Pat. No. 2,856,391, patented Oct. 14, 1958, describes alfin type polymerizations obtained using a lithium alkoxide and an alkenyl lithium compound. The polymers were soft, and easily formed into smooth sheets on a rubber mill, in contrast to alfin polymers which required considerable mill breakdown and/or the addition of oils to produce a smooth sheet on the mill, according to Diem.

In all of the above patents, batch techniques were employed to produce the polymers. Batch techniques are however inefficient, and difficult to adapt to a commercial process. Pat. No. 2,606,179 suggests that the system employed could be easily adapted for continuous polymerization, because the polymer settles to the bottom of the reaction vessel and may be drawn off therefrom, but in fact no continuous system is described.

Pat. No. 3,197,448, patented July 27, 1965 to Gavlin, Hedman, and Hubbard, describes the production of elastomers by subjecting propylene and butdiene mixtures to the action of an alfin catalyst. A batch technique is used. There is no reference to a continuous process.

The difficulties in attempting to prepare alfin polymers by a continuous process are outlined in part by Kizer, Klopfer and Burke in U.S. Pat. No. 3,074,924, patented Jan. 22, 1963. Kizer et al. explain that alkali metal polymerizations of elastomers have generally been restricted to batch-wise of semi-continuous alternate batch-wise systems, because of the long periods required to initiate polymerization and carry it to the desired conversion. Kizer et al. noted that it has been proposed to carry out such polymerizations in continuous tubes, with the materials kept stirred up and advanced along the tubes by internal screw means, but such reactors have not been satisfactory, because of the tendency of the sticky polymer to build up on the walls of the reactor and on the screw, producing variable hold-up and consequently non-uniformity of the polymer, and ultimately complete clogging of the apparatus, requiring that it be taken out of service for clean-out.

Kizer et al. describe a system in which the nonaqueous liquid diluent for the reaction mixture is established in a longitudinally flowing elongated cylindrical stream, into which is introduced a polymerization catalyst, and then the monomer, conducting the polymerization in an extended region of the stream, which is maintained free of agitation and at substantially nonturbulent laminar flow, diverting the inner portions of the body of polymer progressively outwardly towards the periphery of the stream as the body flows longitudinally, and progressively discharging the longitudinally-moving thin annular body of polymer and diluent from the outer periphery of the cylindrical stream using a special valve. Thereafter, the solvent is removed.

It is not necessary, of course, to carry out a continuous polymerization using a single path system, such as described by Kizer et al., although if it were not for the difficulties of carrying out such a system using alfin polymers, it would definitely be a preferred one. Kizer et al. however, barely touch on the problems involved in converting the polymerization of alfin rubbers to a continuous operation. It is necessary to control not only the flow of the polymer through the system, but also its molecular weight. For this purpose, Kizer et al. add a "shortstopping agent" to arrest the polymerization at the desired stage. Greenberg adds a catalyst deactivator for the same purpose. However, this is a serious complication, since the solvent system must be freed from catalyst deactivator, or else it cannot be reused. The polymer that is recovered must be freed from monomer, low polymer such as dimer, solvent, and also catalyst residues. The catalyst (which is a solid) must be kept in a uniform suspension in the reaction mixture throughout the reaction, if polymerization is to be uniform and controllable. At the same time, yield must be optimized, and this is not easy to do while optimizing the other variables, such as solvent recovery.

Accordingly, it is not surprising that when alfin rubbers of relatively low and medium molecular weights, ranging from about 50,000 to about 1,250,000 were provided by Greenberg et al. via U.S. Pats. Nos. 3,067,187 and 3,223,691, all of the preparatory procedures described were batch procedures. There is a reference in the patent to a continuous process, and it is of course possible to visualize the process as a continuous operation, but in fact no details are given in these patents as to how a continuous process in which monomer and solvent are recovered and recycled could be carried out in practice.

The restriction on molecular weight made possible by incorporation of a molecular weight moderator, a dihydroaromatic compound, with the alfin catalyst during the polymerization, for the first time made possible the production of alfin rubbers that were capable of being processed easily, thus avoiding the alternative techniques previously suggested, such as that of Pfau et al. U.S. Pats. Nos. 2,964,083, granted Dec. 13, 1960, and 3,074,902, granted Jan. 22, 1963, who endeavored to reduce working viscosity of the alfin polymers by the incorporation of liquid plasticizers, particularly petroleum hydrocarbon oil. Accordingly, the Greenberg et al. patents have renewed commercial interest in the alfin rubbers, and a commercial development, of course, requires a process that would make it possible to prepare such rubbers as a continuous operation.

In accordance with the instant invention, a continuous process for the preparation of alfin polymers is provided, comprising continuously blending monomer, alfin catalyst, molecular weight moderator and solvent, continuously effecting the polymerization of the monomer at a temperature at which the reaction proceeds by an alfin catalyst in the presence of the molecular weight moderator, continuously separating unreacted monomer, volatile low polymer and solvent from the alfin polymer reaction mixture by quenching the reaction mixture in water, and steam distilling such volatile materials from the resulting dispersion, and thereafter recovering the solvent and optionally the monomer and recycling them for reuse, and washing and drying the alfin polymer.

In the process of the invention, the molecular weight of the polymer is controlled by adjustment of the proportion of molecular weight moderator. No other modification of reaction conditions, proportions of catalyst, and other process variables is required. A catalyst deactivator and the resultant system contamination complicating recycling of unused materials such as monomer and solvent is thus unnecessary, eliminating a serious obstacle heretofore to realization of a continuous process.

A further feature of the continuous process of the invention is the attainment of any desired Mooney value in the alfin polymer within the range from about 30 to about 110 after the polymerization has achieved about 60% of completion, after which Mooney value does not change appreciably even if the reaction conditions be altered. This enables good control of uniformity of the polymer, and is unlike a batch process. The reason for this is not known, but it permits processing of the alfin polymer without deactivation of the catalyst and without regard to possible alteration in the Mooney value of the polymer. This renders the process extremely attractive for commercial application.

The invention also provides for linking alfin catalyst preparation and the preparation of the sodium dispersion used in preparing the alfin catalyst with the continuous alfin polymer process system, preferably using a common solvent or diluent in all three unit operations, and recycling solvent and unreacted starting materials. In this way, a fully self-contained system is provided in which the only raw materials consumed are monomer, molecular weight moderator, and sodium.

These unit operations will now be considered in further detail.

ALFIN CATALYST PREPARATION

The linking of the preparation of the sodium slurry used for the alfin catalyst and of the alfin catalyst formation with the alfin polymerization reaction represents an important continuous process of the invention, and provides attractive savings in operation. If in addition the same inert diluent or solvent is employed in the three steps, recovery of the diluent or solvent and recycling at the conclusion of the polymerization are possible without a solvent fractionation step. The recycle solvent after monomer removal, and removal of catalyst alcohol and olefin, and water, can simply be recycled to each of these operations from a common line.

A particularly effective alfin catalyst is obtained when the sodium is employed as a finely-divided dispersion in the inert diluent, in which the maximum sodium particle size is about 1 to 10 microns, such as may be prepared on a Gaulin mill. When such finely-divided sodium is used, ordinary stirring devices may be employed, instead of high speed comminuting equipment, in the preparation of the alfin catalyst. Moreover, catalyst activity can be more readily reproduced.

The amount of sodium in the dispersion is not critical, and can be adjusted to suit any alfin catalyst preparatory procedure that is desired. Usually, a sodium concentration within the range from about 2 to about 50% is satisfactory.

The inert diluent that is employed for dispersion of the sodium can be any liquid aliphatic or cycloaliphatic saturated hydrocarbon. The hydrocarbon should be a liquid under the conditions during which the sodium dispersion and the alfin catalyst are formed. This requires that it remain liquid at temperatures as low as −20° C. and below, and at temperatures as high as 25 to 130° C. or higher, whichever is the maximum temperature reached during alfin catalyst formation.

The satisfactory aliphatic hydrocarbon solvents that are also useful in alfin catalyst preparation and in alfin polymer formation include pentane, hexane, heptane, octane, nonane and decane, 2-methylpropane, 2-methylbutane, 2,3-dimethylbutane; 2-methylpentane; 3-methylpentane, 2,2-dimethylpentane; 2,3-dimethylpentane; 2,4-dimethylpentane; 2,2,4-trimethylpentane; 2-methylhexane; 3-methylhexane; 2,4-dimethylhexane; 2,5-dimethylhexane; 2,2,4-trimethylhexane; 2,3,4-trimethylhexane; 3,3,4-trimethylhexane; 2-methylheptane; 3-methylheptane; 2,3-dimethyloctane; 2-methylnonane; 3,4-dimethylnonane; 3-methyldecane; 2-methylundecane; 2-methyldodecane; 2,2,4-trimethyldodecane, etc., and mixtures thereof. While the examples have been listed with respect to the mono-, di-, and tri-methyl substituted aliphatic hydrocarbons, it should be appreciated that other lower alkyl-substituted hydrocarbons are considered applicable. Other suitable alkyl radicals include ethyl, isopropyl, butyl, etc. Especially suitable, since they are readily obtainable, are odorless mineral spirits, boiling range 349–406° F., commercial mixtures of branched aliphatic hydrocarbons, such as "Isopar E," a material devoid of normal hydrocarbons, which typically has the composition—

| Component: | Weight percent |
|---|---|
| 2,2,4-trimethylpentane | 2.2 |
| 2,5-dimethylhexane | } 4.8 |
| 2,4-dimethylhexane | |
| 2,3,4-trimethylpentane | 11.5 |
| 2,3,3-trimethylpentane | 21.1 |
| 3-methylheptane | 33.0 |
| 2,2,4-trimethylhexane | 6.2 |
| 3-methyl-4-ethylhexane | |
| 3,4-dimethylheptane | } 5.7 |
| 2,3-dimethylheptane | |
| 3,3,4-trimethylhexane | |
| 15 other iso-components | 13.7 |
| $C_9$ naphtha$+C_{10+}$ | 1.8 |
| | 100.0 | the $C_6$ hydrocarbon mixture having the following composition:

| Component | Weight percent | Range percent |
|---|---|---|
| 2-methylpentane | 16.2 | 8–33 |
| 3-methylpentane | 15.3 | 14–19 |
| n-Hexane | 49.1 | 38–61 |
| Methylcyclopentane | 17.1 | 5–18 |
| Cyclohexane | 1.4 | 0.2–2 |
| Benzene | 0.1 | <1 |
| Unknown (including propane, butanes, pentanes and toluene) | 0.2 | <1 |
| Total | 100.0 | 100.0 | and light alkylates which are devoid of n-hydrocarbons, such as Sinclair's "Light Alkylate," which has the following composition—

| Component: | Weight percent |
|---|---|
| 2-methylbutane | 10.0 |
| 2,3-dimethylbutane | 8.2 |
| 2,4-dimethylpentane | 5.8 |
| 2,3-dimethylpentane | 7.9 |
| 2,2,4-trimethylpentane | 21.5 |
| 18 other $C_8$ and $C_9$ branched aliphatic hydrocarbons | 46.6 |
| | 100.0 |

Also useful are cycloaliphatic hydrocarbons, such as cyclohexane, cyclopentane, methyl cyclohexane, and cycloheptane.

The sodium dispersion in an inert diluent can be employed in the usual way in any desired preparation of alfin catalyst. Typical preparations of an alfin catalyst have been described in sufficient detail in the Greenberg et al. Pats. Nos. 3,067,187 and 3,223,691 and in Hoffman et al. No. 3,317,437, and in the Morton articles supra, so that full details are not required here, and those skilled in the art will know from the following description how to utilize sodium dispersions in accordance with the invention in such preparations.

As the secondary alcohol component, to form the sodium alkoxide, any methyl n-alkyl carbinol having from one to about ten carbon atoms can be used, such as isopropanol, methyl-n-propyl carbinol, and methyl-n-butyl carbinol. Isopropanol is preferred.

The alkoxide will form at rather low temperatures, as low as $-20°$ C. being satisfactory. There is no upper limit on reaction temperature. Consequently, the reaction temperature used is that suitable for metallation of the olefin.

The olefin has from about three to about ten carbon atoms, and should contain the group $-CH=CHCH_2-$. Propylene is preferred, giving allyl sodium, but butene-1, butene-2, pentene-1 and hexene-1 can also be used. Terminal olefins $CH_2=CH-CH_2-$ are preferred. Activity may decrease as the olefin molecular weight increases.

The alkenyl sodium, sodium halide, and sodium alkoxide composing the alfin catalyst are prepared by reaction of the sodium slurry with the alcohol and the olefin in the presence of the dispersing liquid used for the catalyst. This can be and preferably is the same as the inert diluent used for the sodium dispersion. Frequently, however, if a solvent fractionation step is not inconvenient, a lower-boiling hydrocarbon such as hexane is used, to facilitate separation later. Any inert aliphatic or cycloaliphatic hydrocarbon is satisfactory.

The olefin is metallated by use of an alkyl sodium which is prepared in situ from an alkyl halide having from about three to about ten carbon atoms. Butyl chloride is preferred, but amyl chloride, hexyl chloride, hexyl bromide, heptyl chloride, amyl bromide, and octyl chloride can also be used.

The reaction will proceed at low temperatures, which is advantageous when the olefin is a gas, such as propylene. A temperature from about $-20°$ to about $130°$ C. can be employed. From one-half to about five hours' reaction time is normally adequate.

The reaction mixture can be prepared by mixing the catalyst diluent, sodium dispersion and alkyl halide, and then adding the alcohol. After the alkoxide has been formed, the olefin is added, and metallated. Excess olefin may be removed, and the residue can be used as the alfin catalyst, without further treatment or purification. In this method, the sodium is first converted to the alkyl sodium, and half of this is then converted to the alkoxide, while the remainder is converted to alkenyl sodium.

It is also possible to add the alcohol to the sodium dispersion mixed with the catalyst diluent, forming the sodium alkoxide, and then adding the alkyl halide, and, finally, the olefin. This procedure requires half the amount of alkyl halide, and three-quarters the amount of sodium, required by the first procedure, and is therefore preferred in a commercial operation.

THE MOLECULAR WEIGHT MODERATOR

The moderator employed for molecular weight control is a dihydro derivative of an aromatic hydrocarbon, as described in the Greenberg et al. Pat. No. 3,067,187.

The dihydro derivatives of aromatic hydrocarbons as embodied herein include 1,4-dihydrobenzene, 1,4-dihydronaphthalene, 1,2-dihydrobenzene, 1,4-dihydrotoluene, p-1,4-dihydroxylene, allyl benzene, 1-allyl-naphthalene, 1,2-dimethoxy-4-allyl benzene, 1-methoxy-1,4-dihydrobenzene, 1-phenyl-1,4-dihydrobenzene, 1-ethyl-1,4-dihydrobenzene, and 1-ethoxy-1,4-dihydrobenzene; 4-allyltoluene, 4-allyl anisole, 4-allyl-diphenyl, 1,4-diallyl benzene, chlorobenzene, bromobenzene, iodobenzene, 1-bromonaphthalene, 2-bromonaphthalene, and the like, and mixtures of these. 1,4-dihydrobenzene and 1,4-dihydronaphthalene are preferred.

The amount of moderator controls the molecular weight, and the amount required is dependent upon such factors as the temperature and pressure of the reaction and the quantity and type of diluents employed. In general, it may vary from about 0.1 to about 10%, based on the weight of the monomer, and in the case of the preferred moderators the use of about 0.4 to about 1 percent is preferred.

In the practice of the invention, the process conditions, i.e., temperature, time, catalyst and catalyst concentration, are fixed, and the molecular weight is controlled simply by adjustment of the proportion of molecular weight moderator. Thus, complete molecular weight control is obtained by change in only one variable, and that an easily controlled one. The result is a process that is closely controllable within surprisingly narrow tolerance limits.

Although the mechanism of the action of these moderators in molecular weight control is not yet fully understood, carbon-14 studies have shown that at least one molecule of the moderator is present for each polymer chain, the additional aromatic ring being present presumably as a terminal group. These moderators do not change the ratio of 1,4-trans to 1,2-isomers in the resultant polymers, the ratio in the range of 2 to 3 in normal alfin rubbers being retained.

THE ALFIN MONOMER

The process of the invention can be employed in the alfin polymerization of a wide variety of unsaturated organic compounds, including aliphatic dienes such as 1,3-butadiene, 2,3-dimethyl-1,3-butadiene, isoprene, piperylene, 3-methoxy-1,3-butadiene, aryl olefins, such as styrene, the various alkyl styrenes, p-methoxy-styrene, alpha methyl-styrene, vinyl naphthalene, and other unsaturated hydrocarbons. 1,3-butadiene alone and combinations of butadiene and styrene and of butadiene and isoprene are preferred polymerizable unsaturated compounds.

THE ALFIN POLYMERIZATION REACTION

Before employing a monomer in accordance with the invention, it is essential that the monomer be prepared for the alfin polymerization by removing any water that may be present and usually at least part if not all of any polymerization inhibitor, particularly any phenols, such as tertiary butyl catechol, since these materials may destroy the alfin catalyst. First, the water is removed from the monomers, such as in a distillation dryer. If the drying tower is operated at 75 p.s.i.g., cooling water may be used for condensation of both the monomers and the water. The water can then be separated from the hydrocarbon monomer layer, which is recycled to the column. The almost dry monomers can be withdrawn from the dryer as a vapor, and condensed again. The monomers are now essentially dry and contain 20 p.p.m. of water or less, together with a few p.p.m. of the inhibitor, tertiary butyl catechol, for example. The monomer can then be withdrawn, leaving behind the inhibitor, which is essentially nonvolatile relative to the monomer, and is ready for feeding to the polymerization reactor system.

The polymerization is effected in the presence of a hydrocarbon diluent or solvent for the monomer, and the alfin rubber, and that is inert in the reaction. Preferred reaction media are inert aliphatic and cycloaliphatic hydrocarbons, such as pentane, hexane, a 1:1 mixture of hexane and pentane, octane, cyclohexane, cyclopentane, cycloheptane, Decalin, and heptane. The preferred reaction solvent is the same hydrocarbon employed for the dispersion of sodium in the preparation of the alfin catalysts, such as odorless mineral spirits or Isopar E, or commercial hexane or isooctane. Branched chain hydrocarbon solvents tend to give polymers having a lower solution viscosity than straight chain hydrocarbon solvents, and in many cases, consequently, branched chain hydrocarbon solvents are preferred.

The reaction is carried out at an elevated temperature, in contrast to the batch-wise type of reaction described in the Greenberg et al. patent, which employs room temperature or below. Whereas in the Greenberg et al. process the reactants are mixed at a very low temperature, of the order of $-10°$ C., all of the streams of reactants, including catalyst, molecular weight moderator and diluent or solvent, are blended in the continuous operation of the invention at a temperature within the range from about 40 to about 150° F. so as to expedite a rapid attainment of the reaction temperature, in order to facilitate heat removal during the initial stages of the reaction.

The polymerization reaction is carried out in a reaction zone, with the blend of reactants continuously entering at one end, and alfin polymer reaction mixture continuously being withdrawn at another end. The rate of transit through the zone is timed to allow polymerization to proceed at least to 70% of completion at the moderator level employed. This usually requires from about two to about five hours. The polymerization temperature is 40° F. or above, up to approximately 200° F., and preferably within the range from about 120 to about 180° F.

The reaction is exothermic, and after the selected reaction temperature is reached, and reaction is proceeding, the reaction temperature should be controlled by removal of heat liberated in the course of the polymerization. For this purpose, efficient cooling may be needed, with a large surface area exposed to the coolant. The reactors used are provided with coolant systems, such as jackets and cooling coils, through which a coolant can be circulated, such as water.

For more effective control of reaction temperature and hence of the polymerization, a series of reactors can be used. The reactors are operated liquid full, and under pressure, in order to ensure that the reaction is carried out in the liquid phase, in solution or dispersion in the solvent employed. Pressures of from about 1 to about 50 atmospheres are suitable, and higher pressures, up to 300 atmospheres, can be used.

Another important feature of the polymerization is the use of a relatively dilute solution of the reactants. In the batch-wise reaction of the Greenberg et al. patent, for example, a 30% butadiene solution is employed in hexane in Example 1, and a 96% yield of polybutadiene was obtained in this system. On the other hand, in the continuous operation of the process, the effluent from the polymerization reaction system should contain a maximum of 25 weight percent of alfin rubber and preferably from about 8 to about 12 weight percent alfin rubber at the reaction temperature, before solvent removal. As little as 5 weight percent alfin rubber is satisfactory and even 2% can be handled, but of course as the solution becomes more dilute the volumes of solvent being cycled become rather large for the weight of polymer being produced, and efficiency goes down. The olefin and/or diene monomer starting material concentration is adjusted accordingly, and is also at most 15 weight percent, and preferably from about 10 to about 12 weight percent.

The amount of alfin catalyst (solids basis) that is employed is normally from about 1 to about 5 weight percent, and preferably from about 1 to about 3.5 weight percent based on the weight of the unsaturated organic compound.

As indicated previously, it is quite important that water be excluded from the alfin polymerization reaction mixture, and consequently it is essential that all components that are employed therein be anhydrous.

The polymerization reaction is carried out under such conditions that approximately 80 to 85% of the diene and/or olefin monomers entering is polymerized. It is not desirable to obtain a maximum polymerization of the olefin and/or diene starting material, unlike a batch-wise operation. Control of molecular weight and hence of Mooney of the polymer is effected by the amount of the molecular weight moderator that is added. The polymerization product is obtained as a solution in the solvent of the alfin rubber, and this solution of the alfin rubber is referred to as alfin rubber cement.

At the conclusion of the polymerization reaction, an antioxidant can be added, as a preservative for the alfin rubber during subsequent processing. A very small amount of the antioxidant will be effective. An amount within the range from about 0.1 to about 5% by weight of the alfin polymer will suffice. As the antioxidant, there can be employed any organic phenol, organic amine, or aminophenol, such as, for example, 2,2'-methylene-bis(4-methyl-6-tertiary-butyl-phenol) or N-phenyl-2-naphthalamine.

The moderator is used in an amount to give the desired molecular weight. It has been determined that after the desired molecular weight is reached in the continuous process of the invention, it is quite unnecessary to arrest the polymerization. The moderator gives sufficient protection. In fact, to add compounds such as ethanol for the purpose is undesirable, because this will contaminate the solvent system, and since it can poison the alfin catalyst it must be removed before the solvent can be recycled.

REMOVAL OF VOLATILES INCLUDING MONOMER AND SOLVENT AND FORMATION OF ALFIN POLYMER CRUMB

In this step, the alfin polymer is recovered as crumb from the reaction mixture, and any volatile materials are removed by flashing and a simultaneous stem stripping. The operation is carried out continuously in the presence of hot water, to hydrolyze any sodium acetylide and sodium cyclopentadiene, permitting removal (as volatiles) of acetylene and cyclopentadiene. Volatile low polymer is also stripped. The alfin catalyst is hydrolyzed, and any olefin and alcohol released therefrom are removed as well, at this stage.

As the first stage in the steam stripping, the alfin polymer solvent solution withdrawn at the end of the polymerization zone is blended with hot water. The water is preferably at a temperature above the steam distillation temperature of the solvent or diluent to be stripped. This temperature will also be above the boiling point of monomer, catalyst alcohol and catalyst olefin. The water is held at this temperature (inasmuch as the alfin polymer reaction solution is continuously being blended therewith in a crumb former or solvent stripper) by injection of steam. Thus, a true steam distillation of the volatiles is obtained in combination with a very rapid flashing of volatiles, due to the heat of the water when the water and reaction solution are blended. The alfin polymer precipitates from the polymer solution as a wet finely divided crumb and becomes suspended in the water in this form.

The amount of water used is enough to form an alfin polymer crumb suspension containing from about 2 to about 10 weight percent crumb. The maximum crumb content is determined by the handling properties of the suspension.

The alfin polymer reaction solution is blended with the hot water continuously, and the volatiles are continuously drawn off overhead while the alfin rubber crumb that becomes suspended in the water is continuously separated by screening or centrifuging. The solution can be blended with the water at one end of this zone, and the crumb removed at another end. One or several stages can be used, depending on equipment limitations. Conventional crumb formers or solvent strippers as used in the synthetic rubber industry are suitable. To aid in stabilizing the suspension, surface active agent can be added.

The suspension of cement in water simultaneously is subjected to steam stripping. Steam distillation is effected at a temperature within the range from about 50 to about 120° C., as a result of which the suspension can be brought to the boiling point of water. Any volatiles that are not flashed off are steam distilled out.

The steam stripping step is normally carried out under atmospheric pressure. However, it may be desirable to employ sub or super atmospheric pressures, in order to achieve lower or higher stripping temperatures, and good crumb formation.

The time required to remove all volatiles depends to some extent on the amount and type of volatiles and the physical characteristics of the alfin polymer being processed. Usually, from about 2 to about 90 minutes are adequate. For example, an alfin copolymer of butadiene and styrene, containing from about 75 to about 98 weight percent of butadiene, can be recovered from solution in hexane wherein the polymer concentration is about 10%, as an essentially solvent-free rubber crumb, that is, containing less than about 0.5% hexane, by steam stripping at a temperature of from about 200 to about 210° F. for about 3 minutes to a half-hour.

If desired, as an alternative procedure, the alfin polymer reaction solution can first be subjected to a continuous water-washing treatment, preferably passing the reaction solution and the wash water countercurrently to each other, thereby removing isopropanol and water-soluble salts, and facilitating the production of a polymer having an extremely low ash content. The washing step is not necessary, in most cases, however. If it is used, it can be carried out by passing the alfin polymer solution and water countercurrently, and passing the wet polymer solution to a separation zone, where the water separates out as an aqueous phase containing water-soluble impurities, leaving the alfin polymer solution. The alfin polymer solution is then passed to the steam stripping zone.

In a variation of the washing step, in order to ensure a substantially complete removal of water-soluble impurities from the polymer-solvent solution; a two stage or plural stage countercurrent washing can be used.

The volatiles overhead, including monomer, solvent, alcohol, olefin, moderator and water, are drawn off together. The solvent is separated from the monomer, alcohol and olefin by the usual condensation and fractionation techniques, and recycled to the polymerization stage. The monomer can be recovered and recycled, if desired. All are dried before recycling.

CRUMB SEPARATION AND FINISHING

The purpose of this treatment is to dry the alfin rubber crumb, which at this stage may still contain small amounts of the solvent, molecular weight modifier, and any relatively nonvolatile monomer, such as styrene.

The rubber crumb is first separated by running the suspension through a screen. The use of cold water as a wash for the crumb cake will cool the crumb, and prevent its sticking to the screen. The water wash may also leach out any residual water-soluble salts present in the crumb. The alfin polymer crumb from the screen may then be brought to an expeller, which by means of screw compression reduces the water content to below 10%. The remaining water and any solvent can be removed by flashing, compressing the rubber in an expander, so as to heat it, and then releasing the pressure suddenly so that water as steam and solvent flash off. The water is separated, and some is recycled, while some is purged, since this wash water contains salts and build up of salts must be avoided. The final product from the expander can be baled, and is ready for distribution and/or use.

Figure 1:
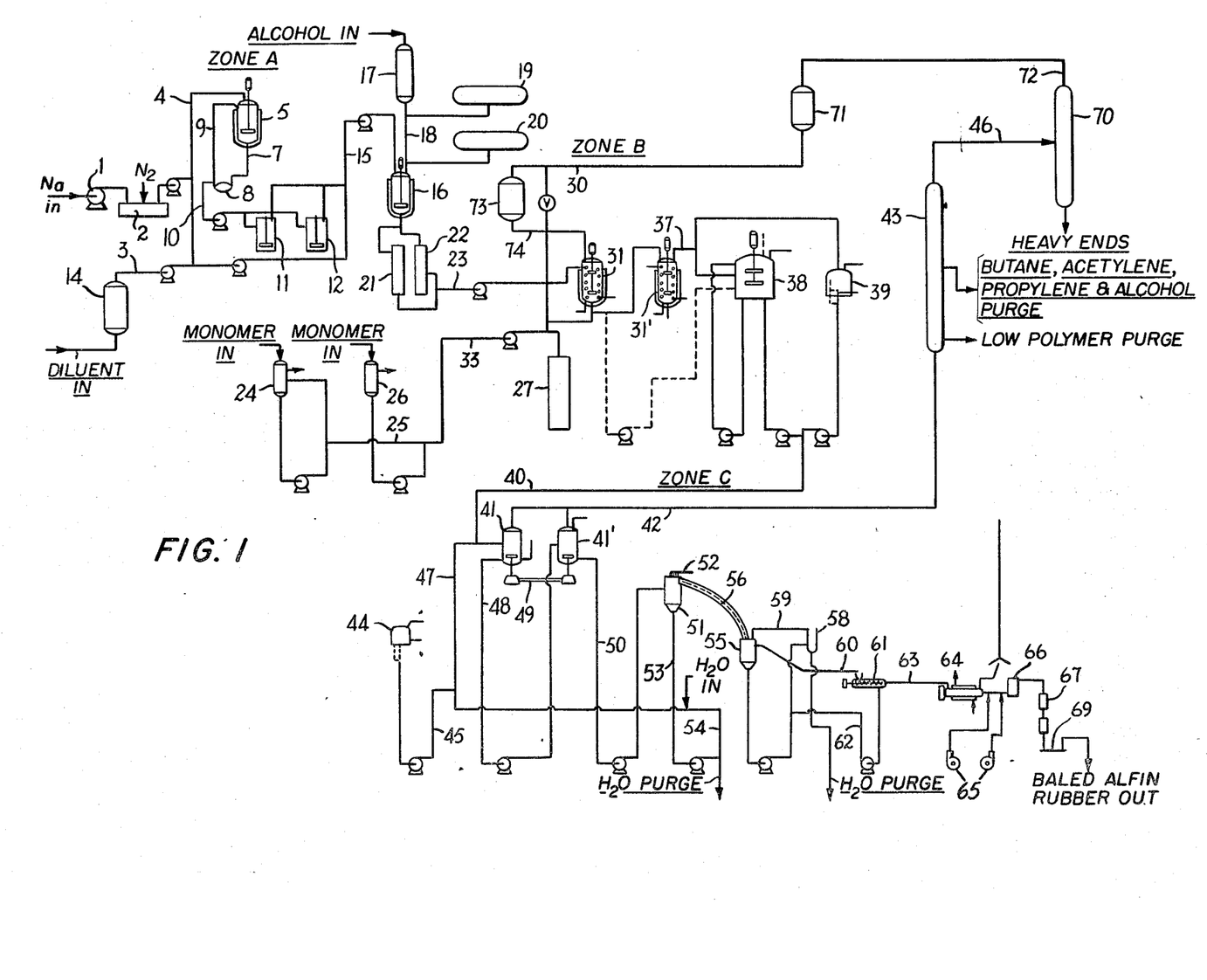
FIG. 1 represents a flow diagram showing the sequence of unit operations involved in a typical apparatus for carrying out the process of the invention.

THE CONTINUOUS SYSTEM OF FIGURE 1

FIG. 1 shows a system in which the continuous process for preparing alfin rubbers in accordance with the invention is carried out in the production of alfin rubbers from butadiene, isoprene and styrene, separately or in any combination.

The synthesis of the alfin catalyst in this system takes place in Zone A. The process shown employs sodium, which is prepared as a dispersion in a liquid diluent at a 25 to 50 weight percent sodium concentration. The molten sodium is fed via pump 1 to the storage tank 2 where it is stored under nitrogen. Diluent enters via line 3 and sodium (molten) via line 4 into the mixing tank 5, whence it is circulated via line 7 to a Gaulin mill 8 to reduce the particle size of the sodium, and then back via line 9 to the mixing tank, to provide an intimate dispersion of sodium of a particle size of less than 10 microns average diameter in the diluent. The finished dispersion is bled off continuously via line 10 to one of two storage tanks 11, 12, equipped with agitators to maintain uniformity.

To prepare the alfin catalyst, a batch technique is used. Diluent from storage 14 is charged via line 15 to the catalyst synthesis reactor 16, an agitated vessel equipped with cooling facilities. Sodium dispersion is added via line 15 from tanks 11 or 12, and isopropyl alcohol is gradually added from storage 17, via line 18 with agitation and cooling at a temperature of approximately 0 to 80° C. Since the reaction is exothermic, the alcohol addition is slow. In this way, one-third of the sodium is converted to sodium isopropoxide. The addition of butyl chloride from storage 19 via line 18 then converts most of the remaining sodium in the tank 16 to equimolar quantities of sodium butyl and sodium chloride. This also is an exothermic reaction and cooling is required. The temperature is held within the range from about 0 to about 80° C.

After the addition of butyl chloride is complete, the reaction is allowed to proceed to completion, with agitation. Propylene from storage 20 is then added directly via line 18 to the liquid contents of the vessel. This addition converts sodium butyl to sodium allyl, with the formation of butane as a by-product. Very little heat is evolved at this point, and the reactor is kept under the pressure of the propylene solution. The pressure at this point should be less than 15 p.s.i.g. The contents of the reactor are held at this temperature for several hours, and the pressure then reduced to atmospheric by venting. Butane and excess propylene may be partially removed by heating. The contents then are transferred to one of two catalyst storage tanks 21, 22. Each storage tank holds approximately a one day supply of catalyst for use in the continuous process of the invention.

The catalyst preparation can be converted to a continuous operation by providing three catalyst reactors in series, in which each step of the catalyst preparation is carried out in sequence.

Catalyst suspension is supplied to the polymerizers continuously from one of tanks 21, 22 via line 23. The tanks are equipped with agitators to avoid settling of the solids.

The alfin monomer polymerization process takes place in Zone B. The process will be described for preparing a butadiene-isoprene rubber. Monomer feed is prepared for use in the polymerization by removing water and any inhibitor in the stripper 24, 26 from butadiene and isoprene, since these substances destroy catalyst. The preparation of a butadiene-styrene rubber is similar, except that only the butadiene is dried. The dry monomers are fed via lines 25, 33 to the first polymerization reactor 31. Dry moderator is stored in tank 27.

The polymerization is carried out by passing recycle stream 30 consisting essentially of iso-octane and some recycled butane and butadiene to the first of six polymerizer reactors 31, 31' (only two are shown). Dry moderator from tank 27 and fresh dry monomer in line 33 are mixed with the recycle in the desired proportions and charged together to the polymerizer. Catalyst is injected separately via line 23. Since the reaction is exothermic, heat must be removed.

A plurality of polymerizer reactors 31, connected in series, in this case, six, is normally used. These are each jacketed, and contain cooling coils. The coolant is water, or other suitable liquid. The reaction temperature is within the range from about 100 to 200° F. The first reactor is expected under proper conditions of operation to be at the lowest temperature, because of the cooling effect of the large mass of solvent entering. A higher temperature is maintained in the second through the fourth stages. The last two stages, because of the lower degrees of conversion, do not require as much cooling. All polymerizers are operated liquid fuel.

The maximum polymerization pressure is that needed to ensure adequate pressure containment in the event of an upset, and also to ensure sufficient pressure for the reactor effluent to flow to the alfin cement blend and feed tanks.

The polymerizer effluent from the last reactor 31' for example flows via line 37 to either the alfin cement blend tank 38 or to the concentrator feed tank 39.

During normal operation, when product of the proper Mooney is being made, the flow will be directly to the feed tank 39. Blending to the desired Mooney level can be obtained by mixing alfin cement from various storage tanks in the blend tank 38.

Alfin cement of the desired Mooney is fed via line 40 to the first of two solvent strippers or crumb formers 41, 41'. Approximately 95% of the total solvent is removed in the first solvent stripper, and substantially all of the residual unreacted butadiene and isoprene are recovered. The combined vapor stream from the solvent strippers flows to a condenser fractionator and is thence recycled.

The crumb formation and finishing operations take place in Zone C. These are the same whether an isoprene or styrene rubber is made. The isoprene rubber case is described.

Rubber cement for example containing approximately 10 to 12 weight percent rubber is continuously charged to the first of two solvent strippers 41, 41'. It is mixed with hot recycled water entering via line 47 so that a suspension of alfin cement in water results. If desired, a dilute solution of emulsifying agent from storage 44 can be added via line 45. The resultant mixture enters the solvent stripper 41, a vessel equipped with a stirrer and overhead collection line 42 running to condenser-fractionator 43. The water is hot enough to flash some of the solvent. Steam is injected via line 49 to effect a steam distillation, and heat the mixture to a temperature of about 205° F., while the mixture is stirred. Solvent vapors escape via line 42. A slurry of alfin rubber crumb results, and the rubber slurry is removed from below and is sent to the second stage solvent stripper 41', which is similar to the first stage. Most of the solvent is removed in the first stage, and the rubber entering the second stage has for example a solvent content of the order of 5 to 10 weight percent, based on the alfin rubber content.

Stripper 41' operates at a temperature of approximately 212° F. Steam is also injected directly into this vessel via line 49. An aqueous slurry of alfin rubber of the order of 2 to 6 weight percent rubber is withdrawn via line 50. The solvent content of the rubber at this point is of the order of 1 weight percent, based on the alfin rubber.

The product vapor stream in line 42 contains essentially all the hydrocarbons that were present with the exception of the rubber. In addition, it contains propylene, formed by decomposition of the catalyst with water to form sodium hydroxide. It also contains isopropyl, alcohol, formed by hydrolysis of the sodium isopropoxide. The rubber crumb contains small quantities of the moderator dihydronaphthalene, styrene (if present), as well as a small amount of solvent. The quantity of solvent in the crumb at this stage should be kept to a minimum by appropriate adjustment of the steam stripping conditions.

The slurry from line 50 enters a separator 51 equipped with a mechanical rake 52, so that rubber crumb which floats to the surface of this vessel can be skimmed off. The water in the lower portion of this vessel, relatively free of rubber crumb, is recycled to stripper 41 via lines 53, 54, 47. In addition, to prevent buildup of salts, a proportion is purged, and replaced by make-up water which enters at line 54.

The rubber crumb which is present in the form of small particles and contains approximately 60 weight percent water and which is raked out enters a dewatering screen separator 55 via a chute 56. In the chute, the rubber crumb is contacted with a stream of cold water which cools the crumb and prevents clogging of the dewatering screen. The addition of water at this point also reduces the salt content of the rubber crumb. The underflow from the screen consists essentially of water containing a small amount of rubber fines, and is withdrawn and pumped to a secondary fines settler 58. Rubber crumb is allowed to overflow from the upper portion of this vessel, and passes via line 59 back on to the screen separator 55. The underflow consists of water containing dissolved salts, and is purged.

The alfin rubber crumb discharged from the separator 55 is fed by conveyor 60 to an expeller 61. The expeller by means of screw compression reduces the water content from approximately 60% to approximately 9 weight percent. The water discharged from the expeller is returned to the fines settler 58, via line 62. The rubber from the expeller passes through line 63 and enters an expander 64. Here, by compression, and jacket-heating, the rubber is heated, so that upon discharge water as steam and solvent flash off. A stream of hot purge air to carry away water vapors and any solvent to prevent condensation in the crumb is provided by blowers 65. The alfin rubber at this point in the form of crumb is conveyed to a crumb conveyor and cooler 66 and subsequently to a baler 67 where it can be packaged in 75 pound bales. These are conveyed via conveyer 69 to storage. The solvent and other volatiles removed at the expander are vented.

The solvent recovery and purification fractionator 43 is designed (1) to recover the monomers and solvent, and (2) to purge the system of butane, acetylene, alcohol, and propylene. The overhead from the fractionator 43 is led via line 46 to the heavy ends tower 70. Butadiene dimer and moderator, also present in the vapor stream from the crumb formers, and styrene, if present, are separated in the heavy ends tower 70 from which the solvent and monomer are removed overhead and passed to the dryer 71 via line 72 after which they are recycled via line 30 to the solvent storage tank 73, whence they can be sent via line 74 to the polymerizers, if desired. If pure solvent is required, for use in the catalyst synthesis or sodium dispersion or in the polymerizers, monomer can be removed by a fractionation step.

The equipment described can be designed to produce 20,000 long tons per year of alfin rubber on a 100% gum basis. This can be either a butadiene-isoprene copolymer, or a butadiene-styrene copolymer. The butadiene-isoprene copolymer can be approximately 80 butadiene and 20 weight percent isoprene. The styrene rubber can be approximately 85% butadiene, and 15 weight percent styrene. The rubber has a 30 to 110 Mooney range.

Figure 2:
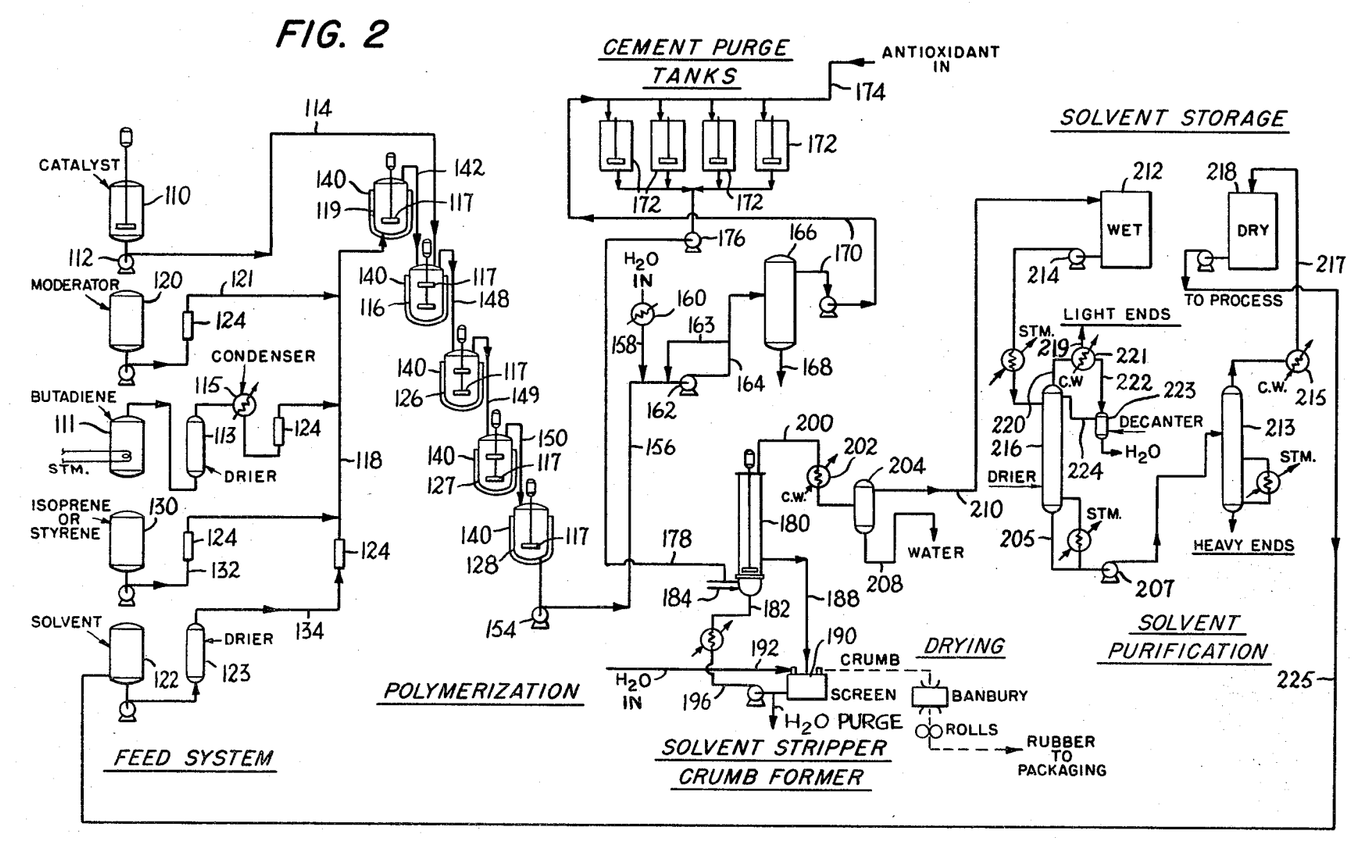
FIG. 2 represents a flow diagram showing another embodiment of the process, utilizing apparatus for carrying out the washing of the reaction mixture at the conclusion of the polymerization.

THE CONTINUOUS SYSTEM OF FIG. 2

In the apparatus of FIG. 2, alfiin catalyst in the form of a solvent slurry, e.g. a hexane slurry, is passed from catalyst feed tank 110 through pump 112 and line 114 to below the surface of the liquid in reactor 116, first of a group of four reactors 116, 126, 127, 128 each equipped with a stirrer 117. Simultaneously with the addition of the catalyst to reactor 116, butadiene is distilled from tank 111 through a molecular sieve drier 113 and thence condensed in condenser 115, and passed into line 118 leading to the mixing tank 119. Simultaneously with this addition, there are also introduced into the mixing tank 119 a molecular weight moderator, e.g., 1,4-dihydronaphthalene from feed tank 120 through line 121, isoprene or styrene from feed tank 130 through line 132, and hexane solvent from tank 122 via drier 123 through line 134. In the case of all feeds to tank 119, there are provided in the feed lines rotameters 124 to regulate the feed rate of each component, thus making adjustable the monomer ratio, the molecular weight of the polymer formed and the concentration of polymer in solution.

Reference numeral 140 denotes the jacket surrounding each reactor through which water or other coolant may be circulated to maintain the reaction temperaure, preferably at about 120 to about 180° F., although higher or lower temperatures, e.g. 100° to 200° F. can be used.

Reaction mixture composed of solvent (hexane), unreacted monomers, and moderator is passed by gravity from tank 119 through overflow pipe 142 to the first reactor 116, where catalyst is added and polymerization begins. The reaction mixture passes through overflow pipe 148 to a second reactor 126, thence via line 149 to the third reactor 127, and thence via line 150 to the fourth reactor 128. Four reactors are utilized herein to provide adequate retention time for the polymerization process, and control heat liberated during the reaction. The first three reactors are run liquid full.

If desired, the process could be conducted in a single reactor, designed to give the desired retention time, although it is believed preferable to utilize at least two reactors, to provide for effective heat removal, to permit more complete reaction, and to obviate the need for recovering unreacted monomers.

The stirrers 117 preferably are of the variable speed, turbine type, whereby speed may be adjusted to give good agitation consistent with the viscosity of the polymer.

Retention time in the four reactors shown may vary considerably, depending upon the nature of the desired polymer. In many cases it has been found that retention time in each reactor of thirty minutes to one hour is entirely suitable, although retention time may be extended to as much as six to eight hours per reactor.

Alfin polymer solution is withdrawn from the bottom of the last reactor 128 and is fed by pump 154 driven by a variable speed motor (not shown) through line 156 to centrifugal wash pump 162, which is employed for the washing operation. Water to be utilized to remove water-soluble salts, isopropanol, and other impurities from the polymer solution is passed through line 158 and a heat exchanger 160 to line 156 from which it enters the centrifugal wash pump 162 together with polymer solution from the reactors. The temperature of the water and organic streams may vary over a considerable range, e.g. from 32° F. to the boiling point of the lowest boiling constituent of the organic phase. However, a system temperature of 120 to 150° F. is preferred. In centrifugal wash pump 162 a temporary emulsion of the water and organic phases is formed, and thence passed through line 164 to a decanter 166 where the heavier water phase containing the water-soluble salts, isopropanol, and other impurities is discharged to waste through line 168, while the lighter organic phase containing the salt-free product is discharged through line 170 to any one of four product solution surge tanks 172. Numeral 163 denotes a recirculation conduit for recirculating aqueous and organic liquid through the centrifugal wash pump 162. If desired, antioxidant may be added to the product at this stage in the operation through line 174.

From surge tanks 172 the polymer solution is fed by pump 176 through line 178 to a solvent stripper 180.

Hot water and steam are passed into the solvent stripper 180 through lines 182 and 184, respectively. The operation of the solvent stripper is such as to result in continuous vaporization of the solvent by mixing of the polymer solution in hot water while simultaneously steam distilling the solvent, thereby forming a slurry of the polymer crumb in water. In the embodiment shown, the polymer crumb overflows at the liquid operating level of the solvent stripper 180, which may be adjusted to provide the retention time required to completely remove the solvent. The crumb is withdrawn through overflow pipe 188 to a screening operation.

The crumb-water slurry passing through overflow pipe 188 is sent to product screen tank 190 into which wash water is also passed through line 192. The water is withdrawn from tank 190 via line 196, and part is recycled to the solvent stripper 180 and part is purged. The washed polymer crumb is removed from the screen tank 190, and may then be passed through subsequent stages such as drying, milling and packaging.

The amount of solvent used in the process of the invention is considerable, and obviously such quantity of solvent cannot be lost and still maintain an economically feasible operation. Accordingly, solvent distilled from solvent stripper 180 and containing some water is passed through line 200 and condenser 202 to the solvent-water separator 204. In this separator the heavier water phase settles to the bottom and is passed through line 208 to waste, while the solvent liquid is passed through line 210 to storage tank 212 and thence fed by pump 214 to a distillation drying column.

The light ends (waxy and solvent) are withdrawn overhead via line 220 to a condenser 221, where they are liquefied, and the noncondensibles including monomer are withdrawn via line 219. Butadiene and in some cases isoprene are recovered and recycled. The condensed liquid is run via line 222 into decanter 223, where the water is separated, and solvent is returned via line 224 to the column 216. The solvent liquid is withdrawn at the bottom of the column via line 205 and run via pump 207 to the heavy ends removal column 213.

The heavy ends are withdrawn at the bottom of the column 213, and styrene if present is recovered and recycled; the remainder is discarded. The dry light solvent ends are condensed in condenser 215 and thence led via line 217 to the dry solvent storage tank 218, after which they are recycled to the solvent feed tank 122 via line 225.

The washing system provides a simple, efficient and highly flexible process for removing water-soluble components from the organic streams encountered in the continuous alfin polymerization process of this invention. Obviously, where the end use of a polymer is such as not to require substantial absence of ash, the entire washing operation may be omitted from the process, and polymer solution passed directly from the reactors to the desolventizing operation.

The washing method of this invention achieves intimate contact of the organic polymer phase with the aqueous phase by feeding of the organic polymer phase and the aqueous phase into a central zone from which the streams are centrifugally impelled radially outwardly at high speed against a peripheral collection zone surrounding the said central zone. The streams are thus converted to an emulsion by the violent radially impelling force and then delivered as a single stream to a discharge zone, and divided into two portions, one of which is recirculated to the central zone for further mixing with fresh feed, while the other portion in emulsion form is passed to a decanting area for separation in the manner described above.

Water is conserved by providing for two or more of the just described washing systems in series. In this embodiment the emulsion formed by the radially impelling force in a first zone is divided into two streams, one of which is recirculated to the central zone for further mixing. The second stream is decanted and the partially washed organic phase is used as the feed for a second stage operation to be intimately contacted with fresh water. The decanted aqueous phase from this second stage is used as the wash liquid for crude organic phase in the first stage.

In contrast to the prior art polymer washing methods using stirred-tank washing means and requiring mixing periods of one-half hour to several hours, the instant washing method requires a mixing time on the order of seconds. Moreover, in many cases, the present washing method obviates the need for catalyst deactivation, polymer precipitation and the addition of emulsion-breaking agents before decantation, which steps are generally required in prior art methods.

The following examples in the opinion of the inventors represent preferred embodiment of their invention.

EXAMPLE 1

A butadiene-isoprene copolymer was prepared in accordance with the following procedure.

Liquid sodium (400 lbs.) at approximately 240° F. was charged to the sodium dispersion preparation tank 5, and 1200 pounds of isooctane run in from storage 14 via line 3 under a pressure of 35 p.s.i.g., whereupon the sodium was dispersed therein at 240° F. via the Gaulin mill 8 to form a uniform dispersion.

An alfin catalyst was prepared by charging 1950 pounds isooctane to the catalyst synthesis reactor 16, after which 550 pounds of the sodium dispersion and 120 pounds of isopropyl alcohol were added with agitation and cooling to maintain approximately 150° F. The alcohol was added over a three hour period. One-third of the sodium was thereby converted to sodium isopropoxide. Then, over a five hour period 190 pounds of butyl chloride was added, converting most of the remaining sodium to equimolar quantities of sodium butyl and sodium chloride. After addition of the butyl chloride was complete, the reaction was completed by stirring for a further hour.

Next, 95 pounds of propylene was added, converting sodium butyl to sodium allyl, with the formation of butane as a byproduct. This was retained in the system.

Catalyst thus prepared was fed to the first reactor 31 via line 23 at a rate of 240 pounds per hour. Dry butadiene was charged continuously via lines 24, 33 at a rate of 480 pounds per hour, and dry isoprene via lines 26, 33 amounting to 120 pounds per hour. 1,4-dihydronaphthalene was added as a moderator at a rate of 3.5 pounds per hour, and isooctane was added at a rate of 4260 pounds per hour. All of the streams were fed in at approximately 100° F.

The six reactors 31, 31' were cooled by water at 85° F., so as to maintain a reaction temperature of 150 to 160° F. in each of the reactors, which were operated liquid full. The pressure in the reactors was 50 p.s.i.g. The reaction mixture was fed in sequence from reactor to reactor, and the total travel and reaction time through the entire seires of six was five hours.

The polymerizer effluent in line 40 contained 10 weight percent alfin rubber at 150° F., and was fed at a rate of 5100 pounds per hour to the first solvent stripper 41, where it was blended with two and one-half times its volume of hot water at 190° F. Steam at a rate of 10 lbs./lb. was injected to heat the suspension to a temperature of 212° F. while the mixture was intensely agitated. The isooctane flashed off, together with butadiene, isoprene, isopropanol, and propylene. Approximately 95% of the total solvent was removed in the first stripper. The vapor streams in line 42 amounted to approximately 4100 pounds per hour. Isooctane and butadiene and isoprene were dried, condensed, separated in the fractionator 43, and recycled. Butadiene dimer was removed in the heavy ends column 70, and was purged.

A 5 weight percent crumb in water resulted, and was drawn off at the bottom of the stripper 41 via line 48, and was sent to the second stage solvent stripper or crumb former 41', where the steam distillation was repeated. The solvent content of the crumb at the beginning of this stage was approximately 10 weight percent, based on the rubber content. The aqueous slurry of rubber emerging from this crumb former had the solvent content reduced to 1 weight percent. The vapor stream in line 42 contained essentially all of the hydrocarbons originally present with the crumb, and in addition propylene and isopropyl alcohol formed by hydrolysis of the catalyst. The rubber crumb contained only small amounts of molecular weight moderator and solvent.

The crumb slurry from the solvent stripper 41' passed through the screen separator 52, removing rubber crumb which floated to the surface of the vessel. The liquid in the lower portion was recycled to the first crumb former 41.

The rubber crumb in the form of small particles containing approximately 60 weight percent water was raked off, and entered the dewatering screen 56, where it was contacted with a stream of cold water at a rate of approximately 13 gallons per minute. This cooled the crumb, prevented clogging of the screen, and reduced salt content. The underflow, consisting of water and a small amount of rubber fines, was pumped to the fines settler 55, where the rubber crumb overflowed from the upper portion of the vessel back on to the screen 56. The underflow was purged. The rubber crumb discharged from the screen was fed by the conveyor 60 to the expeller 61, which reduced the water content by screw compression from 60% to approximately 9%. The rubber crumb then entered the expander 64 where, by compression at several hundred p.s.i., the rubber was heated to approximately 330° F., so that upon discharge from the expander, water as steam and solvent flashed off. The product was then baled in the baler 67, and was ready for distribution. The product had a molecular weight of approximately 200,000, Mooney value 50.

EXAMPLE 2

Utilizing equipment of the nature disclosed in FIG. 2, start-up was begun by feeding monomer, moderator, and solvent to the mixing tank 119. When this had overflowed into the first reactor 116, catalyst feed was begun, utilizing an alfin catalyst slurry in isooctane containing sodium isopropoxide, sodium allyl and sodium chloride, prepared as in Example 1.

Butadiene and isoprene or styrene feeds were at the rates shown in the table which follows. 1,4-dihydronaphthalene was utilized as the molecular weight moderator, and fed to the first reactor at the rate shown, to yield a polymer with Mooney value at from 75 to 90. Additional isooctane was added so that the final concentration of alfin polymer would be about 8 to 8.5 percent. When reactor 116 was liquid-full, solution began to flow into the second reactor 126 and when this reactor was full, material overflowed into the third reactor 127, and then into the last reactor 128. Agitation in the mixing tank 119 was maintained at 150 r.p.m. and in all the reactors it was maintained at 200 r.p.m. When two of the tanks 172 were at operating level, the product recovery system was started.

Operating for varying days and periods of time each day, preparing butadiene-styrene and butadiene-isoprene copolymers, the conditions and results as shown in the following Tables I and II were obtained:

TABLE I.—PRODUCTION SUMMARY DATA—80% BUTADIENE, 20% ISOPRENE

| | Days | | | | | |
|---|---|---|---|---|---|---|
| | 1 | 2 | 3 | 4 | 5 | Total |
| Hour on stream | 22.0 | 24.0 | 24.0 | 24.0 | 17.0 | 313.0 |
| Butadiene fed, lbs | 472 | 281 | 278 | 278 | 214 | 1,323 |
| Average feed rate, lbs./hr | 12.34 | 11.72 | 11.58 | 11.58 | 12.60 | 11.91 |
| Isoprene fed, lbs | 73.2 | 68.4 | 75.2 | 70.4 | 54.0 | 341 |
| Average feed rate, lbs./hr | 3.33 | 2.85 | 3.13 | 2.93 | 3.17 | 3.07 |
| Total monomers fed, lbs | 345 | 350 | 353 | 348 | 268 | 1,664 |
| Average feed rate, lbs./hr | 15.7 | 14.6 | 14.7 | 14.5 | 15.8 | 15.0 |
| Butadiene, isoprene ratio | 78.8:21.3 | 80.4:19.6 | 78.7:23.3 | 79.8:20.2 | 79.9:20.1 | 79.5:20.5 |
| Catalyst fed, lbs | 110 | 138 | 152 | 136 | 112 | 648 |
| Average feed rate, lbs./hr | 5.00 | 5.75 | 6.34 | 5.67 | 6.57 | 5.84 |
| Average lbs. catalyst/lb. monomer | 0.37 | 0.39 | 0.43 | 0.39 | 0.42 | 0.39 |
| 1,4-dihydronaphthalene fed, lbs | 0.92 | 0.92 | 1.02 | 0.92 | 0.58 | 4.36 |
| Average feed rate, lbs./hr | 0.042 | 0.038 | 0.042 | 0.038 | 0.034 | 0.039 |
| Average lbs. 1,4-dihydronaphthalene/lb. monomer | 0.0031 | 0.0026 | 0.0029 | 0.0026 | 0.0022 | 0.0026 |
| Isooctane C fed, lbs | 3,195 | 3,466 | 3,737 | 3,554 | 2,581 | 16,533 |
| Average feed rate, lbs./hr | 145 | 144 | 156 | 148 | 152 | 149 |
| Total feed to reactors, lbs | 3,572 | 3,856 | 4,134 | 3,942 | 2,881 | 18,386 |
| Monomers fed, percent of total feed | 8.25 | 9.07 | 8.54 | 8.83 | 9.31 | 9.05 |
| Average reactor temperature, ° F.: | | | | | | |
| No. 1 | 91 | 91 | 91 | 90 | 91 | 91 |
| No. 2 | 128 | 134 | 134 | 132 | 135 | 135 |
| No. 3 | 126 | 135 | 133 | 131 | 134 | 132 |
| No. 4 | 126 | 137 | 135 | 133 | 137 | 134 |
| No. 5 | 108 | 118 | 114 | 111 | 115 | 113 |
| Rubber recovered, lbs | | | | | | 1,433 |
| Yield, percent | | | | | | 66.1 |
| Mooney range | | | | | | 75.90 |

TABLE II.—PRODUCTION SUMMARY DATA—85% BUTADIENE, 15% STYRENE

| | Days | | | | | |
|---|---|---|---|---|---|---|
| | 1 | 2 | 3 | 4 | 5(6) | Total |
| Hours on stream | 22.6 | 22.5 | 24.0 | 20.7 | 28.0 | 117.8 |
| Butadiene fed, lbs | 254 | 262 | 292 | 251 | 318 | 1,377 |
| Average feed rate, lbs./hr | 11.25 | 11.64 | 12.15 | 12.15 | 11.37 | 11.69 |
| Styrene fed, lbs | 43.8 | 43.9 | 46.0 | 38.6 | 50.1 | 222.4 |
| Average feed rate, lbs./hr | 1.94 | 1.95 | 1.92 | 1.87 | 1.79 | 1.89 |
| Total monomers fed, lbs | 298 | 306 | 337 | 289 | 368 | 1,599 |
| Average feed rate, lbs./hr | 13.19 | 13.59 | 14.07 | 14.02 | 13.16 | 13.58 |
| Butadiene-styrene ratio | 85.3:14.7 | 85.7:14.3 | 86.4:13.6 | 86.7:13.3 | 86.4:13.6 | 86.1:13.9 |
| Catalyst fed, lbs | 107 | 112 | 130 | 132 | 134 | 615 |
| Average feed rate, lbs./hr | 4.73 | 4.97 | 5.43 | 6.39 | 4.79 | 5.23 |
| Average lbs. catalyst/lb. monomer | 0.36 | 0.37 | 0.39 | 0.46 | 0.36 | 0.38 |
| 1,4-dihydronaphthalene fed, lbs | 2.27 | 2.57 | 2.62 | 2.42 | 3.15 | 13.03 |
| Average feed rate, lbs./hr | 0.10 | 0.11 | 0.11 | 0.12 | 0.11 | 0.11 |
| Average lbs. 1,4-dihydronaphthalene/lbs. monomer | 0.0076 | 0.0084 | 0.0078 | 0.0084 | 0.0085 | 0.0081 |
| Isooctane fed, lbs | 2,923 | 2,895 | 2,911 | 2,436 | 3,085 | 14,249 |
| Average feed rate, lb./hr | 129 | 129 | 121 | 118 | 110 | 121 |
| Total feed to reactors, lb | 3,253 | 3,235 | 3,288 | 2,766 | 3,495 | 16,036 |
| Monomers fed, percent of total feed | 9.16 | 9.45 | 10.26 | 10.48 | 10.50 | 9.97 |
| Average reactor temperature, ° F.: | | | | | | |
| No. 1 | 82 | 82 | 82 | 81 | 85 | 83 |
| No. 2 | 132 | 134 | 128 | 129 | 133 | 131 |
| No. 3 | 129 | 134 | 134 | 132 | 138 | 134 |
| No. 4 | 124 | 130 | 132 | 128 | 136 | 130 |
| No. 5 | 117 | 116 | 117 | 116 | 119 | 117 |
| Rubber recovered, lbs | | | | | | 1,400 |
| Yield, percent | | | | | | 87.5 |
| Mooney range | | | | | | 60–65 |

EXAMPLES 3 TO 5

The surprising result of the continuous process of the invention is that a reasonably constant Mooney value in the alfin polymer is attained (within the range from about 30 to 110) as monomer conversion proceeds from 60 to 70% to over 95% of completion. The Mooney value does not change appreciably over this range even if the reaction conditions be altered. This is completely unlike a batch process, in which the Mooney value of the polymer continues to increase as polymerization time is extended.

Thus, in a batch process, in order to obtain control of uniformity of the polymer, it is necessary to closely control the reaction time as well as the other variables and parameters of the reaction, but in a continuous process, this is quite unnecessary, and moreover, it is unnecessary to employ a catalyst deactivator or other means for arresting the reaction at any particular point. Thus, in a continuous process, processing of the alfin polymer can be carried out without deactivation of the catalyst and without regard to possible alteration in the Mooney value of the polymer in the course of transferring the reaction mixtures from the reaction vessel to the alfin polymer work-up stages. As a result, the process is extremely attractive for commercial application.

It is also possible in the process of the invention to link the alfin catalyst preparation and the preparation of the sodium dispersion used in preparing the alfin catalyst with the continuous alfin polymer process system. If a common solvent or diluent is used in all three unit operations, and the solvent and unreacted starting materials are recycled, a fully self-contained system is provided in which the only raw materials consumed are monomer, molecular weight moderator and sodium. In this way, also, the continuous process provides considerable advantages over the batch process.

These distinct differences between a batch process and a continuous process have been verified in the following experiments. In these experiments, the continuous process used was that disclosed in British Pat. No. 1,041,924.

In the batch experiments A to E which are described in the data, the catalyst was added to the solvent in one charge, with the moderator added in several increments during the period of monomer addition. The time of the monomer addition to the batch averaged from 30 to 45 minutes, depending upon the cooling capacity of the system. In the data shown, the polymerization times indicated are listed starting from the time when the monomer feed was begun as zero time.

In the continuous process used, a series of four reactors operating in cascade in the manner shown in FIG. 2 was employed.

In the continuous process, the monomer, solvent and moderator are fed at a constant rate into the first reactor, where they are mixed thoroughly, and flow as a uniform mixture to the second reactor. A continuous flow of catalyst enters subsurface in this reactor, and after mixing uniformly with the solvent, moderator and monomer previously introduced, the reaction mixture overflows to the third reactor, and then to the fourth reactor, and then to the fifth reactor, after which the finished polymer solution is discharged to storage. The system was flowing continuously throughout the experiment for which data is given. The process was not stopped and the reactor sampled, but instead the reactors were sampled while the reaction mixture continued to flow. The reactor system and flow rates were such that the reaction times in each reactor and overall were the same throughout each continuous run and the reaction time per unit of monomer did not vary.

Sampling was carried out by removing a quantity of the alfin rubber cement from each sample point directly into water or alcohol to quench the catalyst, and thereby stop the polymerization at that point. Sampling was started at the last reactor in line, and proceeded from the fifth to the fourth to the thrid to the second, in order to reduce the flow upset to a minimum. The retention times for each vessel was determined by dividing the operating volume of the reactor by the volume of feed entering the first reactor per unit time. No allowance was made for volume change due to mixing or reaction, since this small change was of little consequence.

The operating temperature used for both the batch and continuous operations varied randomly from 120 to 140° F.

The catalyst-to-monomer ratio was not determined. In the batch process, monomer was added in increments, so that monomer was present at the beginning of the reaction, and shortly after reaction had begun. Thereafter, the ratio becomes meaningless. Because the reaction proceeds by addition of monomer to polymer, and its progress is shown by the increase in molecular weight, the catalyst to monomer ratio becomes merely an indirect indication of molecular weight.

In the continuous process, all the reactants were blended in the first reactor and catalyst was added in the second reactor. Thereafter, reaction proceeded by addition of monomer to polymer, and its progress is shown by increase in molecular weight. Thus, here too, the ratio becomes meaningless beyond the second reactor.

In the batch operations, at whatever the level of Mooney viscosity after about 50–60% conversion, Mooney viscosity and intrinsic viscosity consistently continued to increase as polymerization time was extended, and the degree of conversion also increased, while in the continuous runs the Mooney viscosity even though comparable to any of the batch runs after 50–60% conversion remained relatively constant as the monomer conversion proceeded from 60 to 70% to over 95%. The Mooney viscosity can vary plus or minus 5%, due to limits in the method of measurement, and due to limits of the metering equipment used for metering the monomer, moderator and catalyst flows. However, the Mooney values shown in the data are consistent within themselves, indicating that the experimental error due to these variations was within a narrower range than plus or minus 5%.

Since Mooney viscosity and intrinsic viscosity are a direct function of molecular weight, it is evident from the data that as monomer conversion proceeds from 60 to 70%, to over 95%, the molecular weight of the alfin polymer made in the batch system continues to increase with polymerization time, while in the continuous system, molecular weight remains relatively constant. In the batch system, as a result, the final molecular weight can be considerably higher than that obtained in the continuous system, even though both are the same or approximately the same at 50–60% conversion. There is no limit to the molecular weight reached in the batch process, other than any that may be imposed by the degree of completion of the conversion, regardless of the molecular weight at 50–60% conversion, and it continues to increase, whereas in the continuous system, molecular weight remains relatively constant, as monomer conversion proceeds beyond 60 to 70% to over 95%. Thus, the two systems are unexpectedly and inexplicably different.

The molecular weights given in the table are averaged molecular weights. The molecular weight distribution was the normal molecular weight distribution for alfin polymers. The distribution was not determined, but the fact that the average molecular weight remained approximately constant shows that the molecular weight distribution must also have been constant. It it was not, a constant average molecular weight could have been maintained only by an improbable decrease in molecular weight of the highest molecular weight materials, accompanied by a sufficient increase in molecular weight of the lowest molecular weight materials to maintain the same average. The improbability of this can be shown. Due to the direct correlation between Mooney viscosity and molecular weight, it is apparent that both molecular weight distribution and average molecular weight remained relatively constant in the continuous process, as the monomer conversion proceeded 60 to 70%, to over 95% of completion.

| Ex. No. | Monomer feed rate, lbs./hour | Type reaction | Infeed to reactor ||| Reactor number | Overall reaction time, min. | Percent conversion | Mooney viscosity | Molecular weight |
|---|---|---|---|---|---|---|---|---|---|---|
| | | | Percent monomer concentration | Lb. catalyst/lb. monomer | Lb. moderator/lb. monomer | | | | | |
| A | | Batch | 14.9 | 0.054 | 0.0109 | | 138 | 48.7 | 16 | 160M¹ |
| | | | | | | | 175 | 64.9 | 18 | 185M¹ |
| | | | | | | | 201 | 80.5 | 20 | 200M¹ |
| | | | | | | | 224 | 90.0 | 23 | 225M¹ |
| | | | | | | | 313 | 96.8 | 29 | 240M¹ |
| B | | do | 14.9 | 0.054 | 0.0084 | | 122 | 46.9 | 25 | 235M¹ |
| | | | | | | | 160 | 62.9 | 33 | 285M¹ |
| | | | | | | | 208 | 78.9 | 37 | 310M¹ |
| | | | | | | | 236 | 89.5 | 46 | 370M¹ |
| | | | | | | | 320 | 95.0 | 63 | 450M¹ |
| C | | do | 10.7 | 0.052 | 0.0168 | | 40 | 15.2 | ¹10 | 80M |
| | | | | | | | 80 | 51.4 | ¹15 | 160M |
| | | | | | | | 120 | 71.0 | ¹30 | 240M |
| | | | | | | | 160 | 91.2 | ¹40 | 360M |
| | | | | | | | 225 | 100.0 | ¹50 | 390M |
| D | | do | 10.5 | 0.063 | 0.0241 | | 40 | 31.0 | ¹8 | 65M |
| | | | | | | | 60 | 37.0 | ¹12 | 100M |
| | | | | | | | 80 | 82.3 | ¹14 | 140M |
| | | | | | | | 120 | 96.0 | ¹40 | 360M |
| | | | | | | | 160 | 100.0 | ¹65 | 420M |
| E | | do | 14.8 | 0.054 | 0.00502 | | 120 | 54.9 | 66 | 455M¹ |
| | | | | | | | 170 | 64.7 | 72 | 465M¹ |
| | | | | | | | 230 | 82.4 | 86 | 525M¹ |
| | | | | | | | 340 | 91.2 | 128 | 650M¹ |
| 3 | 15 | Continuous | 9.7 | 0.078 | 0.0058 | 1 | 45 | 50.0 | 43 | 365M¹ |
| | | | | | | 2 | 90 | 83.2 | 47 | 370M¹ |
| | | | | | | 3 | 135 | 90.1 | 49 | 390M¹ |
| | | | | | | 4 | 155 | 90.7 | 47 | 370M¹ |
| 4 | 15 | do | 10.5 | 0.56 | 0.0056 | 1 | 45 | 22.0 | 46 | 370M¹ |
| | | | | | | 2 | 90 | 51.4 | 70 | 460M¹ |
| | | | | | | 3 | 135 | 55.4 | 69 | 460M¹ |
| | | | | | | 4 | 155 | 96.9 | 64 | 455M¹ |
| 5 | 15 | do | 9.4 | 0.052 | 0.0054 | 1 | 45 | 60.3 | 59 | 400M¹ |
| | | | | | | 2 | 90 | 77.5 | 64 | 455M¹ |
| | | | | | | 3 | 135 | 80.4 | 65 | 455M¹ |
| | | | | | | 4 | 155 | 95.9 | 65 | 455M¹ |

¹ Approximate.

Examples A to E are batch runs, and Examples 3 to 5 are continuous runs.

The batch runs data show that regardless of the Mooney value at 50–60% conversion, Mooney continues to increase as conversion proceeds to above 95%. The increase in Mooney is in fact usually greater over the range from above 80% to above 90% than over the range from 50% to 80%. In B, for instance, Mooney increased from 25 to 37 over 46.9 to 78.9% conversion, and from 37 to 63 over 78.9 to 95.0% conversion. In E, the increase from 54.9 to 82.4% conversion was from 66 to 86, and from 82.4 to 91.2% conversion it was from 86 to 128. Thus, a batch run displays an accelerating increase in molecular weight, as conversion exceeds 80%.

The continuous runs data show the exact opposite. At 60–70% conversion, molecular weight reaches a reasonably constant value, and virtually no increase in molecular weight is noted as conversion proceeds to over 95%.

This is true regardless of the Mooney value at 50–60% conversion. In the batch runs A to G, molecular weight continues to increase after 60% conversion even though at 50–60% conversion the molecular weight is already as high as in the continuous runs at 90–95% conversion. Thus, in batch run No. E, the Mooney value at 54.9% conversion was 66, and it continued to increase, to 128 at 91.2% conversion, whereas in Example 5, the Mooney value at 60.3% conversion was 59, and at 95.9% it was 65, having been 64 to 65 since 77.5% conversion. In Example 5, the Mooney actually decreased slightly, to 64 at 96.9% from 70 at 51.4%, a phenomenon not observed in any batch run.

The data also demonstrate that the reason the Mooney value becomes reasonably constant after 60–70% conversion is not because this is the limiting molecular weight obtainable. This is demonstrated by batch run No. E. Even though at 50–60% conversion it is already as high in molecular weight as the reasonably constant molecular weight reached in continuous runs Examples 4 and 5 at 50–60% to over 95% conversion, the molecular weight continues to increase, reaching a value nearly double that at 50–60%, after 91% conversion. In a batch procedure, a reasonably constant Mooney viscosity value is not reached until conversion is complete, as far as it will proceed. That is in excess of 90%, at any of the Mooney viscosity values obtained in batch runs A to E. These runs show that the actual Mooney viscosity at any given percent conversion is not a factor controlling the ultimate Mooney viscosity reached, in a batch process, and that it is not a controlling factor in the continuous process, either.

It will further be noted in the data that in the batch runs A to E considerably more moderator than in the continuous runs Examples 3 to 5 was required for molecular weight control. This phenomenon is noted in all batch and continuous operations, and the reason for it is unknown.

Because it is unnecessary to arrest the polymerization reaction to obtain a reasonably constant Mooney value, the continuous process which is the subject of this invention makes no provision for this. The quenching of the reaction mixture with water followed by steam distillation of the volatile materials does, of course, result in a decomposition of the alfin catalyst, but long before this has taken place, the reaction mixture has reached a relatively stable equilibrium Mooney value at from 60 to 70% of monomer conversion, depending upon the particular reaction conditions adopted. It is therefore quite incorrect to say that in the continuous process of the invention the reaction mixture is quenched in order to inactivate the catalyst. The quenching in fact has the function of facilitating separation of the low volatile materials, and making it possible to recover the alfin polymer in a processable condition as an aqueous slurry of convenient solids content.

In this respect, the continuous process of the invention of course differs from the batch process disclosed in the Greenberg et al. Pat. No. 3,067,187. In this batch process, Greenberg et al. destroy the catalyst with ethanol, in order to arrest the reaction. In the batch process, of course, deactivation of the catalyst is essential, because the reaction does not reach reasonably constant Mooney value at any stage. However, one would not expect the attainment of a reasonably constant Mooney value as the monomer conversion proceeds from 60 to 70% to over 95% of completion in a continuous process, and there is no suggestion of this in the Greenberg et al. patent.

Moreover, Greenberg et al. does not disclose a quenching step in which water is employed to work up the reaction mixture and facilitate the separation and recovery of alfin polymer and the low volatile recoverable and recyclable components.

Having regard to the foregoing disclosure, the following is claimed as the inventive and patentable embodiments thereof:

1. A continuous process for the preparation of alfin polymers from alfin monomers, comprising (1) establishing a reaction zone including at least two reactors operating in cascade into which an organic unsaturated alfin monomer, active alfin catalyst, molecular weight moderator and solvent are continuously fed and blended; (2) continuously conducting the blend with active alfin catalyst through the cascade series of reactors while effecting the polymerization of alfin monomer at an elevated temperature at which the reaction proceeds to a substantially constant Mooney viscosity at a monomer conversion of at least 60% of completion without quenching catalyst, and controlling molecular weight by adjustment of the amount of molecular weight moderator without quenching catalyst; (3) continuously withdrawing reaction mixture of substantially constant Mooney viscosity containing active alfin catalyst from the last reactor of the cascade series; (4) continuously separating volatile materials including unreacted monomer, volatile low polymer, and solvent from the alfin polymer reaction mixture by blending the reaction mixture with water, and steam-distilling such volatile materials from the resulting dispersion, and thereafter recovering solvent and, if desired monomer, for reuse, and (5) washing and drying the alfin polymer.

2. The process of claim 1, wherein the molecular weight of the polymer is controlled solely by adjustment of the proportion of molecular weight moderator, while maintaining reaction conditions, proportion of catalyst, and other process variables relatively constant.

3. The process of claim 1 wherein the polymerization is effected at a temperature within the range from about 40 to about 200° F.

4. The process of claim 1 wherein the alfin catalyst is sodium allyl-sodium isopropoxide.

5. The process of claim 1 wherein the molecular weight moderator is a dihydroaromatic component.

6. The process of claim 1 wherein the dihydroaromatic component is a dihydronaphthalene.

7. The process of claim 1 wherein the monomer is butadiene.

8. The process of claim 1 wherein the monomer is butadiene and isoprene.

9. The process of claim 1 wherein the monomer ie butadiene and styrene.

10. The process of claim 1 wherein the steam-distillation is carried out at a temperature within the range from about 80 to about 100° C.

11. The process of claim 1 wherein the alfin catalyst and sodium dispersion used for making the alfin catalyst are prepared in the same solvent employed for the alfin monomer polymerization reaction, and solvent is recycled to all three steps.

12. The process of claim 1 wherein the moderator is in an amount within the range from about 0.1 to about 10%.

13. The process of claim 1 wherein the amount of monomer employed is calculated to give an alfin polymer concentration in the reaction solution within the range from about 2 to about 15 weight percent.

14. A process in accordance with claim 1 in which an alfin polymer is produced of from about 30 to about 110 Mooney.

15. A process in accordance with claim 1 in which volatiles are removed by quenching in hot water at from about 80 to about 100° C.

16. A process in accordance with claim 1 which includes washing the reaction mixture with water.

17. A process in accordance with claim 16 in which the water is flowed countercurrently to the reaction mixture during the washing.

18. A continuous process for the preparation of alfin polymers, comprising (1) establishing a reaction zone including at least two reactors operating in cascade into which an organic unsaturated alfin monomer, active alfin catalyst, molecular weight moderator and solvent are continuously fed and blended; (2) continuously conducting the blend with active alfin catalyst through the cascade series of reactors while effecting the polymerization of an alfin monomer at an elevated temperature at which the reaction proceeds to a substantially constant Mooney viscosity at a monomer conversion of at least about 60% of completion without quenching catalyst, and controlling molecular weight by adjustment of the amount of molecular weight moderator without quenching catalyst; (3) continuously withdrawing reaction mixture of substantially constant Mooney viscosity containing active alfin catalyst from the last reactor of the cascade series; (4) continuously separating volatile materials including unreacted monomer, volatile low polymer, and solvent from the alfin polymer reaction mixture by blending the reaction mixture with water, and steam distilling such volatile materials from the resulting dispersion, and thereafter recovering solvent and, if desired, monomer, for reuse, and (5) washing and drying the alfin polymer.

19. A process in accordance with claim 18 in which alfin catalyst is prepared in an inert solvent for use in the process, starting from sodium suspended in an inert solvent, methyl-n-alkyl carbinol and olefin, and such solvent, carbinol and olefin are also recovered in the steam distillation, and at least the solvent recycled.

20. A process in accordance with claim 18 in which the water is also recycled.

References Cited

UNITED STATES PATENTS

| | | | |
|---|---|---|---|
| 2,953,556 | 9/1960 | Wolfe et al. | 260—94.7 |
| 3,067,187 | 12/1962 | Greenberg et al. | 260—94.2 |

OTHER REFERENCES

Hansley & Greenberg, Manufacture of Alfin Rubber-Molecular Weight Control. Rubber Age 94(1), October 1963.

JAMES A. SEIDLECK, Primary Examiner

R. A. GAITHER, Assistant Examiner

U.S. Cl. X.R.

160—93.5 R, 94.2, 83.7